United States Patent
Donti et al.

(10) Patent No.: US 9,996,560 B1
(45) Date of Patent: Jun. 12, 2018

(54) TEMPLATE MAPPING SYSTEM FOR NON-COMPLIANT COLLECTORS

(71) Applicant: Juniper Networks, Inc., Sunnyvale, CA (US)

(72) Inventors: Hari Krishna Donti, San Jose, CA (US); Chetan D. Kothari, San Jose, CA (US); Ranadip Das, Fremont, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 562 days.

(21) Appl. No.: 14/609,983

(22) Filed: Jan. 30, 2015

(51) Int. Cl.
   *G06F 17/30* (2006.01)
   *H04L 29/08* (2006.01)
   *H04L 12/26* (2006.01)

(52) U.S. Cl.
   CPC .... *G06F 17/30289* (2013.01); *H04L 43/0876* (2013.01); *H04L 67/10* (2013.01)

(58) Field of Classification Search
   CPC  H04L 43/0876; H04L 67/10; G06F 17/30289
   USPC .................................................. 707/609, 758
   See application file for complete search history.

(56) References Cited

U.S. PATENT DOCUMENTS

| | | | | |
|---|---|---|---|---|
| 5,907,848 A | * | 5/1999 | Zaiken ................... | G06Q 40/02 707/999.202 |
| 9,531,886 B2 | * | 12/2016 | Wong ...................... | H04M 3/36 |
| 2004/0196310 A1 | * | 10/2004 | Aamodt ................ | G06F 3/0482 715/738 |
| 2009/0043778 A1 | * | 2/2009 | Jambunathan .... | G06F 17/30563 707/E17.009 |

OTHER PUBLICATIONS

Claise, "Cisco Systems NetFlow Services Export Version 9," http://tools.ietf.org/pdf/rfc3954.pdf, Oct. 25, 2004, 33 pages.
Claise, "Specification of the IP Flow Information Export (IPFIX) Protocol for the Exchange of IP Traffic Flow Information," http://tools.ietf.org/pdf/rfc5101.pdf, Jan. 31, 2008, 63 pages.
Sivakumar et al., "IPFIX Information Elements for logging NAT Events," http://tools.ietf.org/pdf/draft-ietf-behave-ipfix-nat-logging-02.pdf, Nov. 30, 2013, 15 pages.
Stein et al., "IP Flow Information Export (IPFIX) Entities," http://www.iana.org/assignments/ipfix/ipfix.xhtml, Aug. 13, 2014, 47 pages.

(Continued)

*Primary Examiner* — Phong H Nguyen
(74) *Attorney, Agent, or Firm* — Harrity & Harrity, LLP

(57) ABSTRACT

A system may include one or more devices to receive a flow record. The one or more devices may identify a type of the flow record. The one or more devices may parse the flow record for a template identifier (ID) if the type of the flow record is a data record. The one or more devices may further compare the template ID from the data record to a predetermined template ID identifying a data record of template IDs. The one or more devices may identify the data record as a data record of template IDs if the template ID matches the predetermined template ID. The one or more devices may further generate a map associating template IDs, from the data record of template IDs, to template information for decoding and/or interpreting data records. The one or more devices may store the map.

20 Claims, 12 Drawing Sheets

(56) References Cited

OTHER PUBLICATIONS

Juniper Networks, "Juniper Flow Monitoring: J-Flow on J Series Services Routers and Branch SRX Series Services Gateways," http://www.juniper.net/us/en/local/pdf/app-notes/3500204-en.pdf, Mar. 26, 2011, 10 pages.

Wikipedia, "NetFlow," http://en.wikipedia.org/wiki/NetFlow, Nov. 28, 2014, 11 pages.

* cited by examiner

US 9,996,560 B1

TEMPLATE MAPPING SYSTEM FOR NON-COMPLIANT COLLECTORS

BACKGROUND

Network devices, such as routers and switches, aggregate and transmit Internet Protocol (IP) flow data to one or more flow collectors. The IP flow data provides a network administrator with near real time network monitoring capabilities. The network administrator may use the IP flow data to plan, understand new services, and allocate network and application resources to responsively meet customer demands.

SUMMARY

According to some possible implementations, a system may include one or more devices to receive a flow record. The one or more devices may identify a type of the flow record. The one or more devices may parse the flow record for a template identifier (ID) if the type of the flow record is a data record. The one or more devices may further compare the template ID from the data record to a predetermined template ID identifying a data record of template IDs. The one or more devices may identify the data record as a data record of template IDs if the template ID matches the predetermined template ID. The one or more devices may further generate a map associating template IDs, from the data record of template IDs, to template information for decoding and/or interpreting data records. The one or more devices may store the map.

According to some possible implementations, a computer-readable medium may store instructions that, when executed by one or more processors, cause the one or more processors to: receive a data record that includes a template identifier (ID); read the template ID from the data record; determine whether the template ID matches a predetermined template ID; identify the data record as a data record of template IDs if the template ID matches the predetermined template ID; generate a map associating template IDs, included in the data record of template IDs, with template information for decoding and/or interpreting data records; and output or store the map.

According to some possible implementations, a method may include receiving, by a device, a first data record. The method may include parsing, by the device, the first data record for a first template identifier (ID). The method may include comparing, by the device, the first template ID from the first data record to a predetermined template ID identifying a data record of template IDs. The method may include identifying, by the device, the first data record as a data record of template IDs if the first template ID for the first data record matches the predetermined template ID. The method may include generating, by the device, a map associating template IDs, from the data record of template IDs, to template information for decoding and/or interpreting data records. The method may include using, by the device, the map to identify the template information associated with a second template ID to decode and/or interpret a second data record that includes the second template ID.

DETAILED DESCRIPTION

Figure 1A:
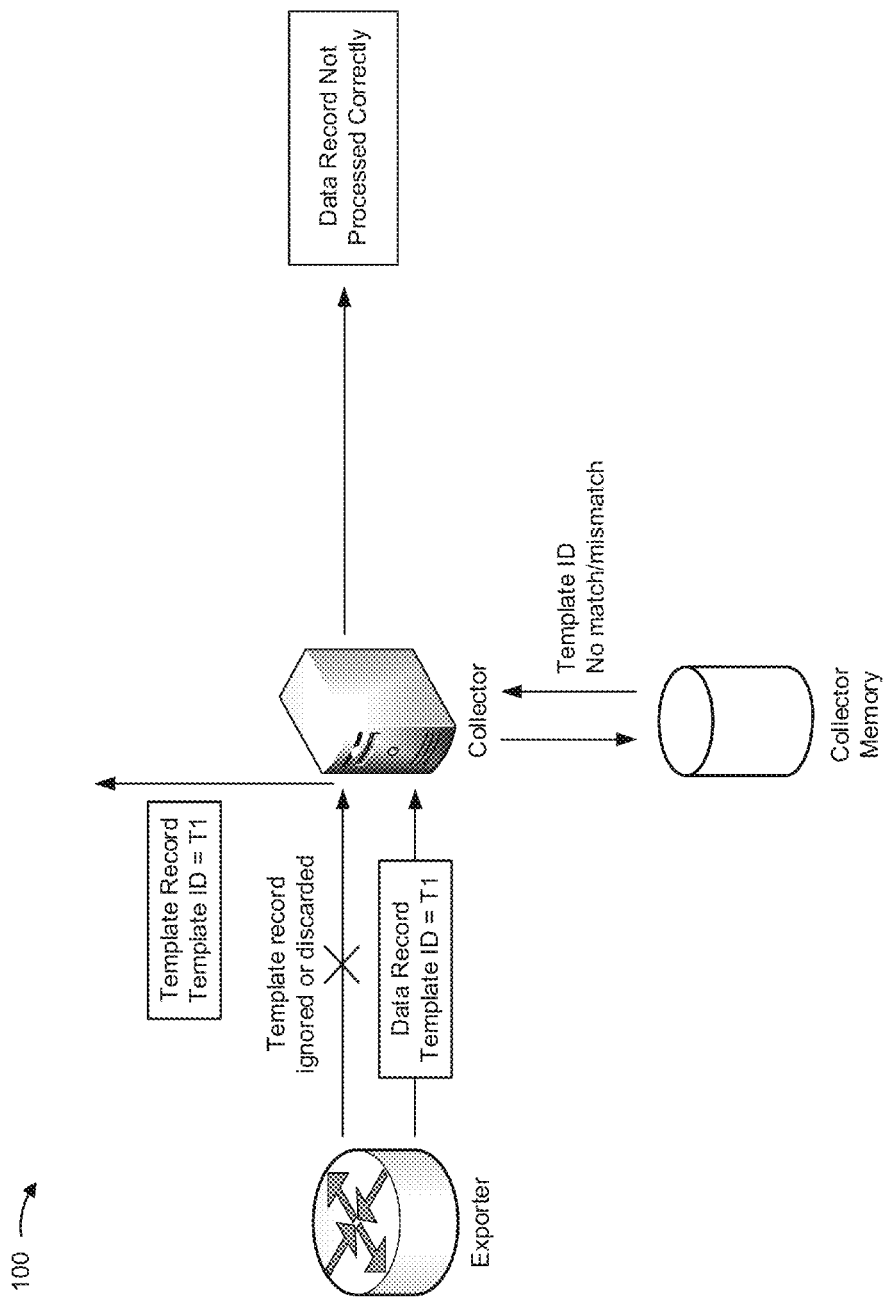
FIGS. 1A-1C are diagrams of an overview of an example implementation described herein.

The following detailed description of example implementations refers to the accompanying drawings. The same reference numbers in different drawings may identify the same or similar elements.

In packet switching networks, a flow is a sequence of packets with common characteristics, such as a same source and destination IP address, transport layer port information, and/or type of IP protocol. Network devices (e.g., routers, switches, hubs, etc.) differentiate flows depending on characteristics, such as architecture, implementation, and device configuration of the flows. A network device may collect and/or aggregate flow information for traffic that is received or sent through the network device. The network device may log the flow information locally. The network device may also function as an exporter and transmit the flow information as a flow record to an external information collector (i.e., a collector). Flow records provide fine-grained information on network visibility for a variety of purposes, such as enterprise accounting, Internet service provider (ISP) billing, and/or data monitoring.

Data records are a type of flow record. A data record may be sent from an exporter to a collector for various flow-related events (e.g., NAT events). The exporter may assign, to a data record, an identifier called a template identifier (ID). A template is used to decode/interpret a data record. The template defines a structure and an interpretation of the data record. For example, the template defines format and field attributes (e.g., a type, a length, a name, etc.) to decode/interpret the data record. The exporter may transmit the template to the collector as another type of flow record, called a template record. The exporter may assign, to the template record, the same template ID as the corresponding data record.

The exporter, however, may not transmit a corresponding template record each time a data record is sent to the collector. Therefore, the collector may store the template record to decode/interpret a corresponding data record sent by the exporter at a later time.

Due to limitations in the collector, such as bandwidth and processing limitations, a collector may choose not to receive template records. Instead, the collector may choose to pre-configure information (hereinafter template information) associated with the template records (e.g. field information, size information, whether a field is mandatory, template ID, etc.). Collectors that choose to not receive template records are referred to herein as non-compliant collectors.

A template ID and/or an association between a template ID and corresponding template information may change over time. For example, a configuration change in the exporter may result in the exporter generating new template IDs. In another example, another exporter (e.g., an exporter from another vendor) may reuse template IDs for flow-related events different from the flow-related events associated with the template IDs and included in the template information. A non-compliant collector may not receive the changes and continue to use template IDs that are no longer current, leading to erroneous processing and/or decoding/interpretation of the data records.

Implementations described herein provide a template mapping system for non-compliant collectors that allows for the decoding and/or interpretation of data records even when the non-compliant collectors are configured not to receive template records. The template mapping system for non-compliant collectors may use a special data record referred to herein as a data record of template IDs that provides information associating current template IDs to various flow-related events (e.g., NAT events). The data record of template IDs may have a predetermined template ID. The collector may have corresponding template information for the data record of template IDs, linked by the predetermined template ID, to decode and/or interpret the data record of template IDs. The collector may use the data record of template IDs to dynamically generate a map associating current template IDs to corresponding template information for various flow-related events.

Figure 1B:
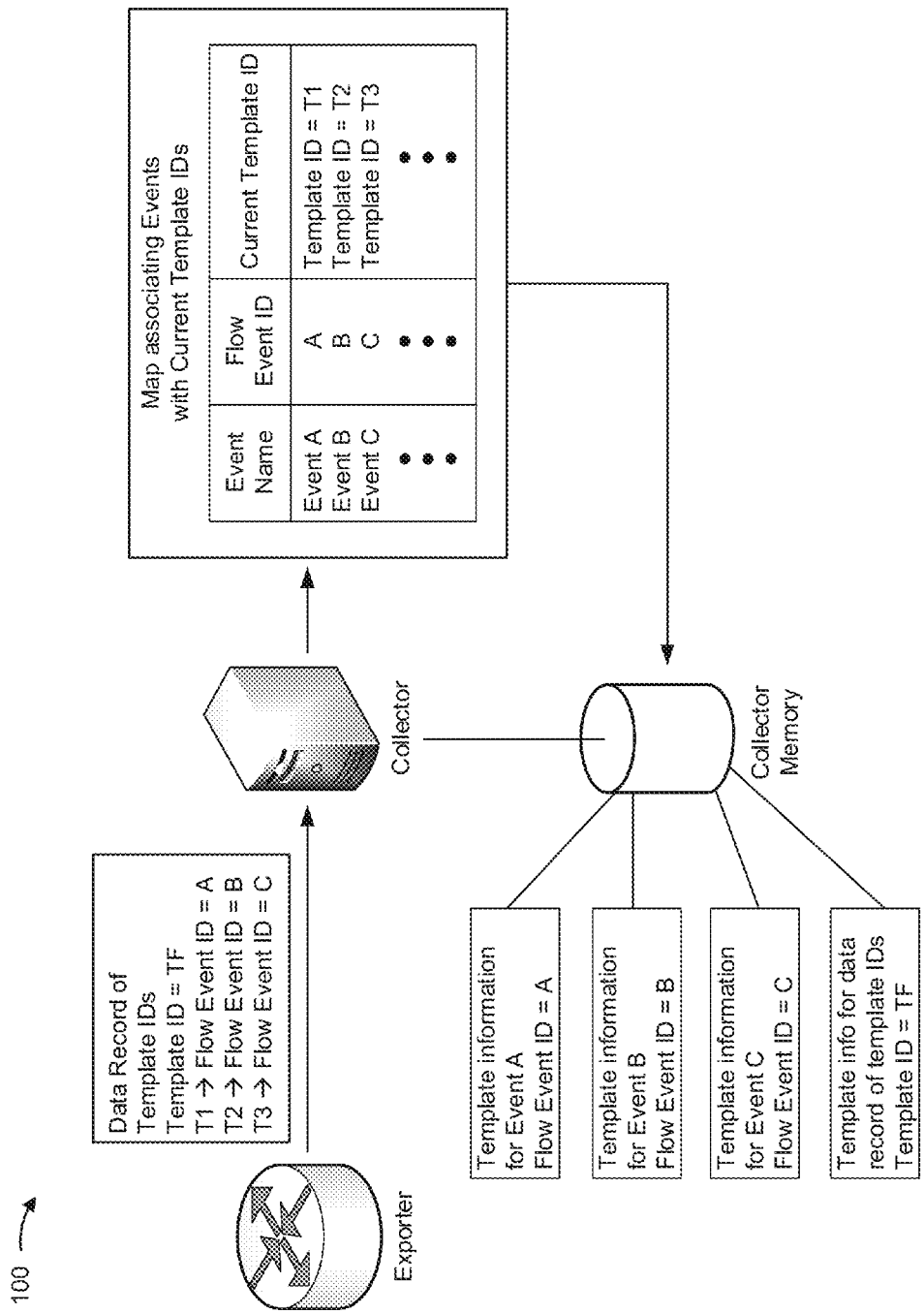
Figure 1C:
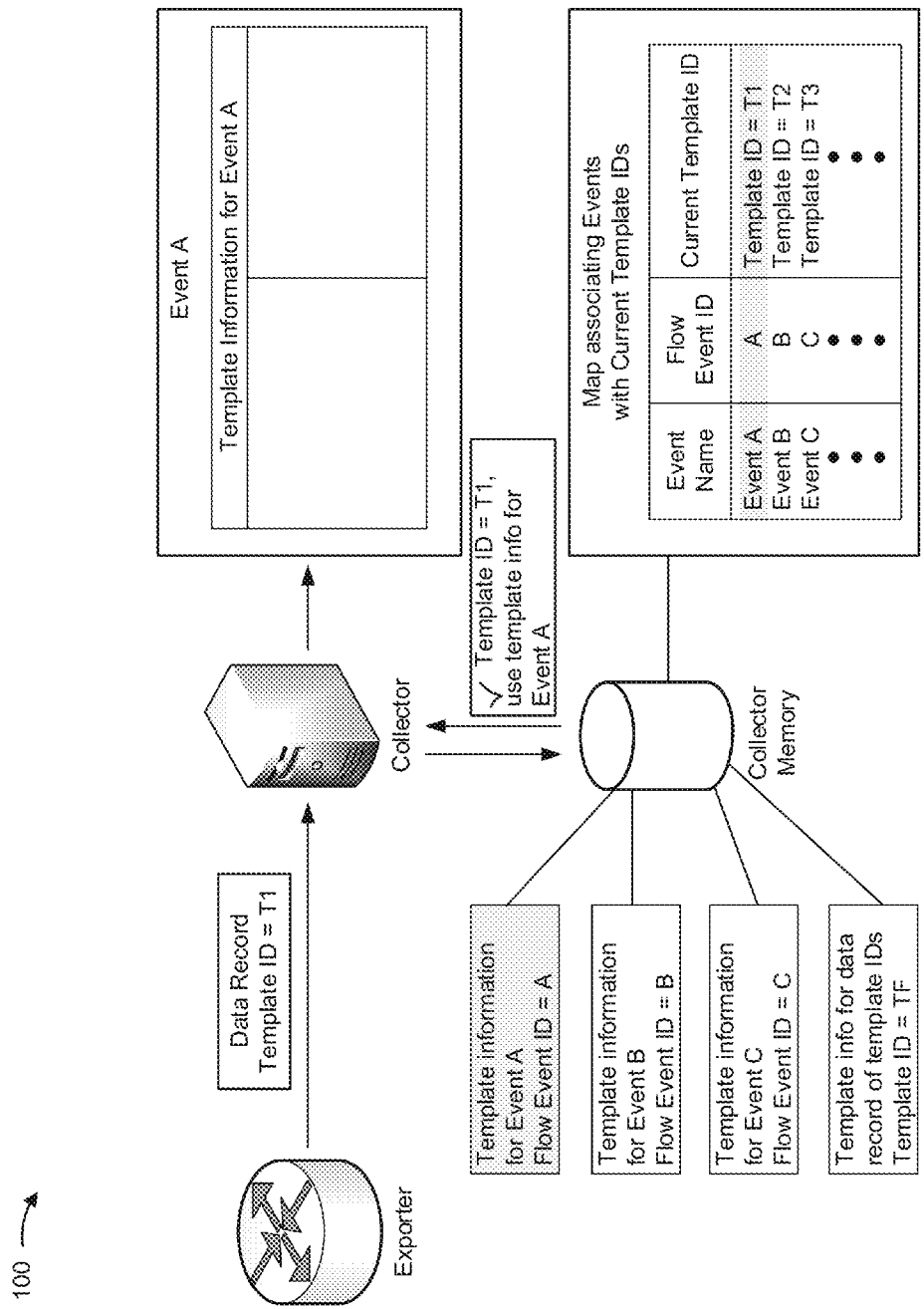

FIGS. 1A-1C are diagrams of an overview of an example implementation 100 described herein. As shown in FIG. 1A, assume that an exporter transmits, to a collector, a data record with a template ID=T1 and a corresponding template record with the same template ID (i.e., template ID=T1) for decoding and/or interpreting the data record. Assume the collector is non-compliant and configured to discard/ignore template records. As shown in FIG. 1A, the collector may discard/ignore the template record but may receive the data record transmitted from the exporter. Without a corresponding template record, the collector may either find no matching template information or may use out-of-date template information to decode and/or interpret the data record. As shown in FIG. 1A, the collector may incorrectly decode and/or interpret the data record as a result.

As shown in FIG. 1B, assume that the exporter transmits, to a collector, a special data record with a predetermined template ID (e.g., template ID=TF) and that includes current template IDs associated with various flow-related events. The collector may receive and parse the special data record for a template ID. The collector may identify the special data record as a data record of template IDs based on the predetermined template ID=TF. The collector may parse the remainder of the data record of template IDs, using corresponding template information (e.g., template information associated with predetermined template ID=TF). The collector may use the data record of template IDs and template information associated with various flow-related events, stored in a collector memory and/or another device, to dynamically generate a map associating current template IDs (e.g., current template ID=T1, current template ID=T2, current template ID=T3, etc.) to corresponding template information (e.g., template information for Event A, template information for Event B, template information for Event C, etc.), linked by an identifier for the various flow-related events (e.g. Flow Event ID=A, Flow Event ID=B, Flow Event ID=C, etc.).

As shown in FIG. 1C, assume that the exporter transmits, to the collector, a data record with a template ID=T1. The collector may use the map to correctly decode and/or interpret the data record, by associating the template ID=T1 with the template information for Event A, linked by Flow Event ID=A. By using such a map, non-compliant collectors may still decode and/or interpret data records even when the non-compliant collectors are configured not to receive template records.

Figure 2:
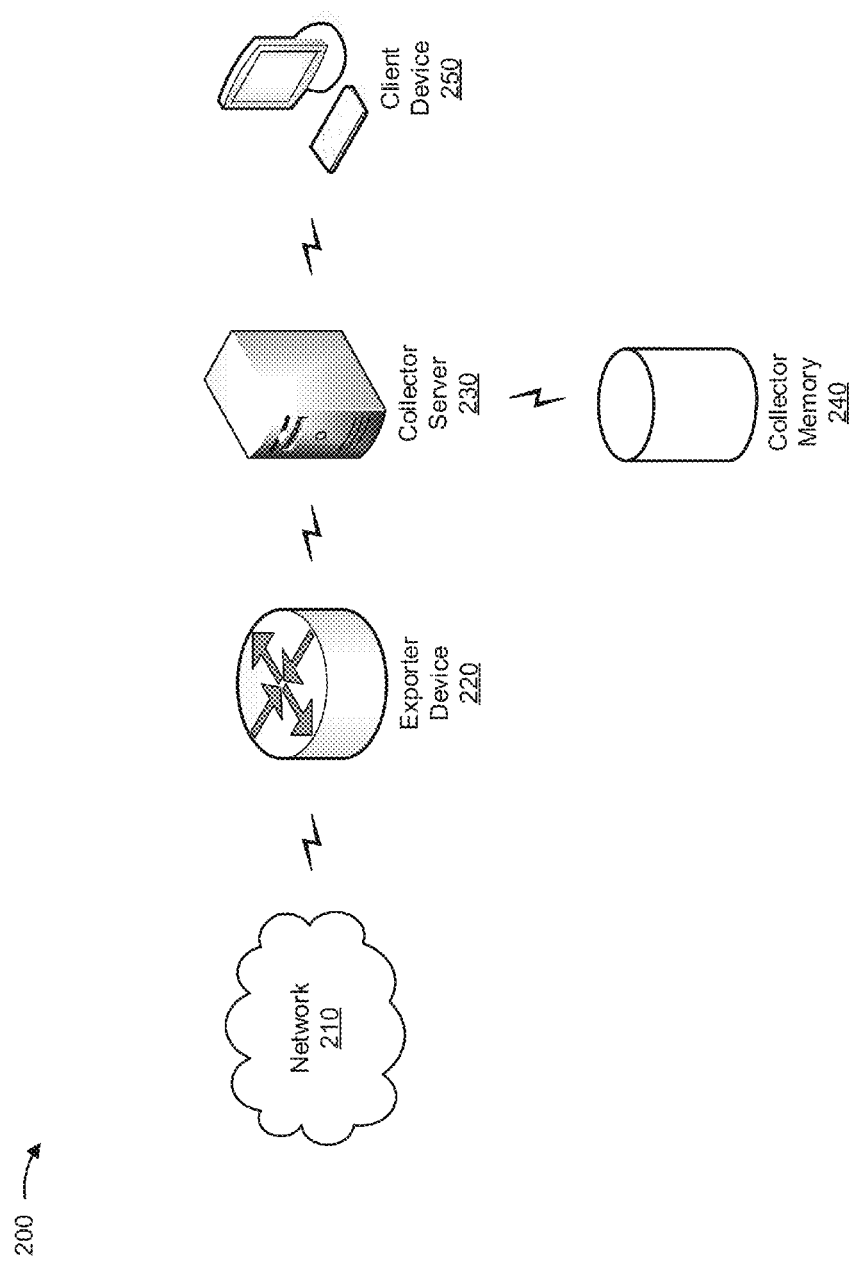
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network 210, an exporter device 220, a collector server 230, a collector memory 240, and a client device 250. Devices of environment 200 may interconnect via wired connections, wireless connections, or a combination of wired and wireless connections.

Network 210 may include one or more wired and/or wireless networks. For example, network 210 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some implementations, network 210 may include a source network from which traffic originates, a destination network to which traffic is destined, or a combination of a source network and a destination network. For example, the source network might correspond to a client network and the destination network might correspond to a server network, or vice versa.

Exporter device 220 may include one or more devices (e.g., one or more traffic transfer devices) capable of processing and/or transferring traffic associated with network 210. For example, exporter device 220 may include a firewall, a router, a gateway, a switch, a hub, a bridge, a reverse proxy, a server (e.g., a proxy server), a security device, an intrusion detection device, a load balancer, or a similar device. In some implementations, exporter device 220 may receive traffic from a source network and transmit the traffic to a destination network.

In some implementations, exporter device 220 may generate, process, and/or transfer flow records, such as data records, template records, and/or other flow records. In some implementations, multiple exporter devices 220 may transmit flow records to one collector server 230. In some implementations, one exporter device 220 may transmit flow records to multiple collector servers 230.

Collector server 230 may include one or more server devices capable of generating, processing, and/or providing information. In some implementations, collector server 230 may generate, process, store, and/or provide decoding and/or interpretation of data records received from exporter device 220 and/or another device. Additionally, or alternatively, collector server 230 may generate, process, store, and/or provide a map associating current template IDs with corresponding template information for various flow-related events. In some implementations, collector server 230 may include a communication interface that allows collector server 230 to receive information from exporter device 220, collector memory 240, client device 250, and/or another device. In some implementations, one collector server 230 may receive flow records from multiple exporter devices 220. In some implementations, multiple collector servers 230 may receive flow records from one exporter device 220.

Collector memory 240 may include one or more memory devices capable of processing, storing, and/or providing information. In some implementations, collector memory 240 may process, store, and/or provide information, such as template information for various flow-related events, template information for decoding and/or interpreting a data record of template IDs, a map associating current template IDs with corresponding template information, configuration information for ignoring and/or discarding template records, or the like.

Client device 250 may include a device capable of providing, presenting, and/or displaying information. For example, client device 250 may include a mobile phone (e.g., a smart phone, a radiotelephone, etc.), a computing device (e.g., a desktop computer, a laptop computer, a tablet computer, a handheld computer, etc.), or a similar device. In some implementations, client device 250 may include a communication interface that allows client device 250 to receive information from exporter device 220 and/or receive information from and/or transmit information to collector server 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
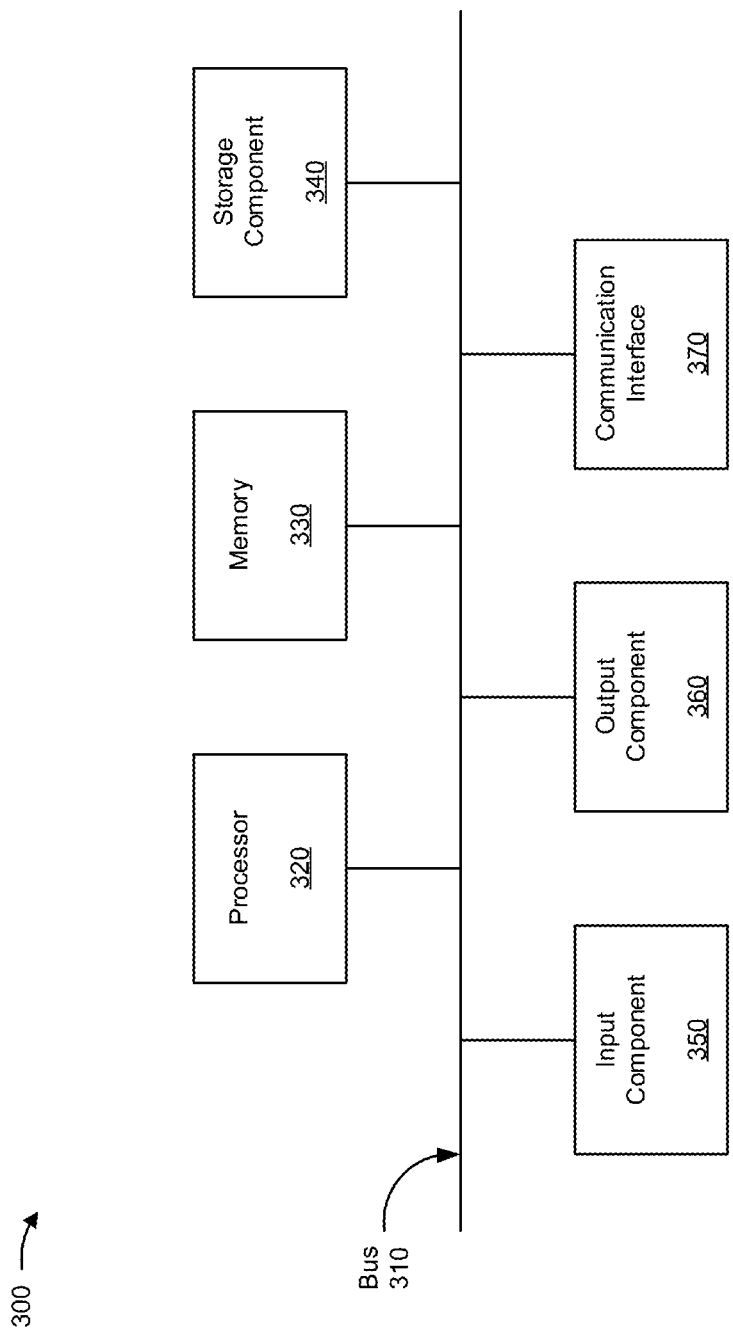
FIG. 3 is a diagram of example components of one or more devices of FIG. 2.

FIG. 3 is a diagram of example components of a device 300. Device 300 may correspond to exporter device 220, collector server 230, collector memory 240, and/or client device 250. In some implementations, exporter device 220, collector server 230, collector memory 240, and/or client device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
FIG. 4 is a flow chart of an example process for setting up a template mapping system for non-compliant collectors.

FIG. 4 is a flow chart of an example process for setting up a template mapping system for non-compliant collectors. In some implementations, one or more process blocks of FIG. 4 may be performed by collector server 230. In some implementations, one or more process blocks of FIG. 4 may be performed by another device or a set of devices separate from or including collector server 230, such as exporter device 220 and/or client device 250.

As shown in FIG. 4, process 400 may include obtaining flow record identifier information (block 410). For example, collector server 230 may obtain flow record identifier information that includes flow record identifiers (e.g., FlowSet IDs). The flow record identifiers may be assigned with predetermined values, distinguishing between types of flow records. For example, a flow record with a FlowSet ID=X1 (e.g., 0) may identify the flow record as a template record, a flow record with a FlowSet ID=X3 (e.g., 256, 257, 258, etc.) may identify the flow record as a data record, or the like.

Collector server 230 may obtain the flow record identifier information in various ways (e.g., retrieving the flow record identifier information from another device, such as client device 250; sending a request to obtain the flow record identifier information from another device, such as client device 250; receiving the flow record identifier information from another device, such as client device 250, without sending a request to the other device; obtaining the flow record identifier information from a user of collector server 230, client device 250, and/or another device; etc.). Collector server 230 may store the flow record identifier information in collector memory 240.

As further shown in FIG. 4, process 400 may include obtaining information to discard and/or ignore template records (block 420). For example, collector server 230 may obtain information to discard and/or ignore flow records when the flow record identifier of a received flow record matches the predetermined value indicating that the flow record is a template record with FlowSet ID=X1 (e.g., 0).

Collector server 230 may obtain the information to discard and/or ignore the template records in various ways (e.g., retrieving the information to discard and/or ignore template records from another device, such as client device 250; sending a request to obtain the information to discard and/or ignore the template records from another device, such as client device 250; receiving the information to discard and/or ignore the template records from another device, such as client device 250, without sending a request to the other device; obtaining the information to discard and/or ignore the template records from a user of collector server 230, client device 250, and/or another device; etc.). Collector server 230 may store the information to discard and/or ignore the template records in collector memory 240.

As further shown in FIG. 4, process 400 may include obtaining template information (block 430). For example, collector server 230 may obtain template information, such as formatting information and/or field attributes (e.g., a field name, a field type, a field length, etc.). The formatting information and/or field attributes may be used to determine where data associated with one field ends and where data associated with another field begins in a data record. The template information may be written in various languages (e.g., XML, XSL, scripting languages, etc.).

In some implementations, collector server 230 may include obtaining template information associated with one or more flow-related events (e.g. NAT events). For example, for a NAT 1 event (e.g., a NAT44 Session create event), the template information may include formatting information and/or field attributes for various associated fields for the NAT1 event (e.g., timestamp, natInstanceID, vlanID/ingressVRFID, sourceIPv4Adress, etc.). For a NAT 2 event (e.g., a NAT44 Session delete event), the template information may include formatting information and/or field attributes for various associated fields for the NAT 2 event (e.g., timestamp, natInstanceID, vlanID/ingressVRFID, sourceIPv4Adress, etc.). For a NAT 3 Event (e.g., a NAT Addresses exhausted event), the template information may include formatting information and/or field attributes for various associated fields for the NAT 3 event (e.g., timestamp, natInstanceID, natEvent, natPoolID, etc.). These are simply examples of flow-related events. In some implementations, collector server 230 may obtain template information associated with another type of NAT event or a flow-related event unrelated to NAT events.

Additionally, or alternatively, the template information may include a template ID to assist collector server 230 in determining which template information to use to correctly decode and/or interpret a corresponding data record. In some implementations, collector server 230 may obtain template information with a predetermined template ID that may be used to decode and/or interpret a corresponding data record of template IDs.

Collector server 230 may obtain the template information in various ways (e.g., retrieving the template information from another device, such as client device 250; sending a request to obtain the template information from another device, such as client device 250; receiving the template information from another device, such as client device 250, without send a request to the other device; obtaining the template information from a user of collector server 230, client device 250, and/or another device; etc.). Collector server 230 may store the template information in collector memory 240.

As further shown in FIG. 4, process 400 may include obtaining a predetermined template ID for a data record of template IDs (block 440). For example, collector server 230 may obtain a predetermined template ID=TF (e.g., 4, 5, 6, etc.), indicating a data record of template IDs. Collector server 230 may use the template information corresponding to the predetermined template ID to decode and/or interpret the data record of template IDs. Collector server 230 may obtain the template information in various ways (e.g., retrieving the predetermined template ID from another device, such as client device 250; sending a request to obtain the predetermined template ID from another device, such as client device 250; receiving the predetermined template ID from another device, such as client device 250, without sending a request to the other device; obtaining the predetermined template ID from a user of collector server 230, client device 250, and/or another device; etc.). Collector server 230 may store the predetermined template ID for a data record of template IDs in collector memory 240.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
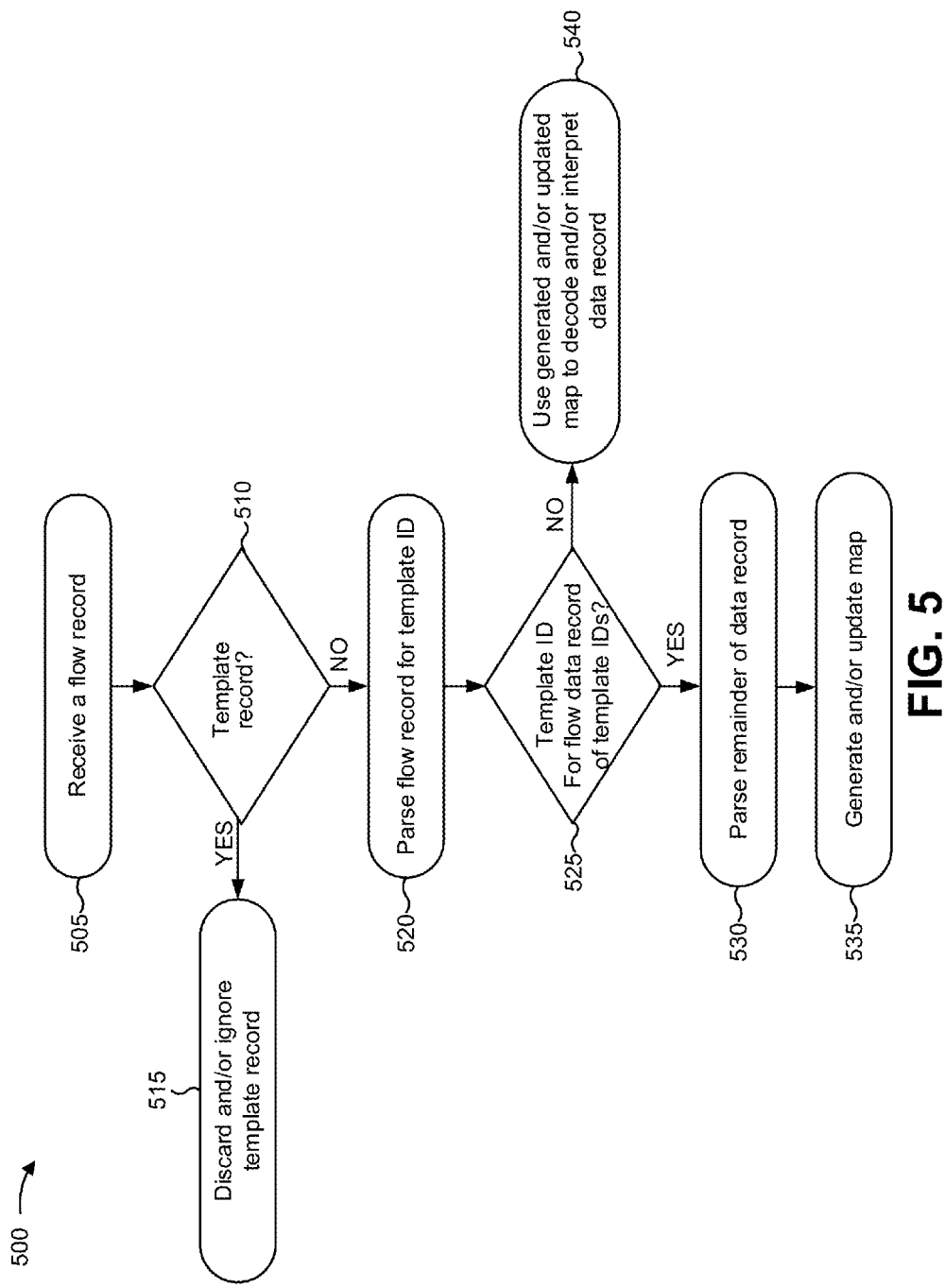
FIG. 5 is a flow chart of an example process for using a template mapping system for non-compliant collectors.

FIG. 5 is a flow chart of an example process for using a template mapping system for non-compliant collectors. In some implementations, one or more process blocks of FIG. 5 may be performed by collector server 230. In some implementations, one or more process blocks of FIG. 5 may be performed by another device or a set of devices separate from or including collector server 230, such as exporter device 220 and/or client device 250.

As shown in FIG. 5, process 500 may include receiving a flow record (block 505). For example, collector sever 230 may receive a flow record transmitted by exporter device 220 as part of an export packet. The export packet may include a packet header and a packet payload. The packet header may provide information about the packet (e.g., a quantity of flow records contained within the packet, a source address, a destination address, identification information, etc.). The packet payload may include one or more flow records.

In some implementations, collector server 230 may receive the flow record transmitted by exporter device 220 at a conclusion of a flow (e.g., a flow record is sent when a Transmission Control Protocol (TCP) connection is closed between two flows, a flow record is sent when a TCP connection is forced closed because of inactivity, a flow record is sent at the conclusion of certain non-TCP flows, such as a domain name system (DNS) lookup over a user datagram protocol (UDP), etc.). In some implementations, collector server 230 may receive a flow record transmitted by exporter device 220 at a set interval (e.g., every 15,000 milliseconds, every 20,000 milliseconds, every 25,000 milliseconds, etc.). In some implementations, collector server 230 may receive flow records from multiple exporter devices 220.

As further shown in FIG. 5, process 500 may include determining whether the flow record is a template record (block 510). For example, collector server 230 may identify a type of the flow record. The type of flow record may be a template record or a data record, in some implementations. Collector server 230 may identify the type of flow record by parsing the flow record for a flow record identifier (e.g., a FlowSet ID). Additionally, or alternatively, collector server 230 may compare the value of the parsed flow record identifier with flow record identifiers (FIG. 4, block 410) to identify the type of the flow record. For example, a FlowSet ID=X1 (e.g., 0) may identify the flow record as a template record, a FlowSet ID=X2 (e.g., 256, 257, 258, etc.) may identify the flow record as a data record, or the like. This is one way of determining whether the type of the flow, and other ways are possible.

As further shown in FIG. 5, when the flow record is a template record (block 510—Yes), process 500 may include discarding and/or ignoring the template record (block 515). For example, if collector server 230 determines that the value of the parsed flow record identifier matches the flow record identifier FlowSet ID=X1 (e.g., 0) for a template record, then collector server 230 may discard and/or ignore the flow record as a template record.

In some implementations, the template record may be deleted immediately. In some implementations, the template record may be collected and deleted in a batch after some set interval of time (e.g., after one hour, after twenty-four hours, after one month, etc.). In some implementations, collector server 230 may ignore the template record by stopping further processing of the template record.

As further shown in FIG. 5, when the flow record is not a template record (block 510—No), process 500 may include parsing the flow record for a template ID (block 520). For example, if the flow record is not a template record with FlowSet ID=X1 (e.g., 0), then collector server 230 may identify the flow record as a data record. Additionally, or alternatively, collector server 230 may parse the data record for a template ID. In some implementations, collector server 230 may parse the data record using a parsing tool (e.g., an XML parser, Python, Kibana, Logstash, etc.) to identify the template ID.

As further shown in FIG. 5, process 500 may include determining whether the data record is a data record of template IDs (block 525). For example, collector server 230 may compare the parsed template ID, identified in block 520, with a predetermined template ID=TF (e.g., 4, 5, 6, etc.), reserved for decoding and/or interpreting data records of template IDs (e.g., FIG. 4, block 440). If the parsed template ID matches the predetermined template ID=TF, then collector server 230 may determine that the data record received by collector 230 is a data record of template IDs. By identifying a data record as a data record of template IDs, collector server 230 may receive changes to current template IDs (e.g., due to a configuration change at exporter 220) even when collector server 230 is configured not to receive template records.

As further shown in FIG. 5, when the data record is a data record of template IDs (block 525—Yes), process 500 may include parsing the remainder of the data record of template IDs (block 530). For example, collector server 230 may parse the data record of template IDs, using template information associated with the predetermined template ID=TF (e.g., FIG. 4, blocks 430 and 440). The template information may include a template with fields for current template IDs and corresponding identifiers for various flow-related events.

In some implementations, the fields may be formatted in a pattern (e.g., a current template ID field 1 followed by a corresponding flow-related event identifier field A, a current template ID field 2 followed by a corresponding flow-related event identifier field B, a current template ID field 3 followed by a corresponding flow-related event identifier field C, etc.). Additionally, or alternatively, the data record of template IDs may be parsed to find data corresponding to the formatted data fields (e.g., a current template ID=T1 followed by a corresponding Flow Event ID=A, a current template ID=T2 followed by a corresponding Flow Event ID=B, a current template ID=T3 followed by a corresponding Flow Event ID=C, etc.).

This is one way of formatting the template information associated with the predetermined template ID and parsing a data record of template IDs using the template information associated with the predetermined template ID. Other ways are possible. In some implementations, collector server 230 may parse the data record of template IDs using a parsing tool (e.g., an XML parser, Python, Kibana, Logstash, etc.) to decode and/or interpret formatting information and/or field attributes (e.g., a field name, field type, a field length, etc.).

As further shown in FIG. 5, process 500 may include generating and/or updating a map (block 535). For example, collector server 230 may use the data record of template IDs and template information associated with various flow-related events, stored in collector memory 240 and/or another device, to dynamically generate a map associating current template IDs (e.g., current template ID=T1, current template ID=T2, current template ID=T3, etc.) to corresponding template information (e.g., template information for Event A, template information for Event B, template information for Event C, etc.), linked by an identifier for the various flow-related events (e.g. Flow Event ID=A, Flow Event ID=B, Flow Event ID=C).

Additionally, or alternatively, collector server 230 may update a map based on receiving a new data record of template IDs (e.g., a second data record of template IDs, a third data record of template IDs, etc.). The data record of template IDs may be considered new if collector server 230 has previously generated and/or stored a map in collector memory 240 and/or another device. By dynamically generating and/or updating the map, non-compliant collectors may still decode and/or interpret data records even when the non-compliant collectors are configured not to receive template records.

As further shown in FIG. 5, when the template ID for a data record does not match the predetermined template ID (block 525—No), process 500 may include using the generated and/or updated map to decode and/or interpret the data record (block 540). For example, collector server 230 may determine that a received data record with template ID=T1 (e.g., 256, 257, 258, etc.) is not a data record of template IDs because the template ID=T1 for the data record does not match the predetermined template ID=TF (e.g., 4, 5, 6, etc.).

Additionally, or alternatively, collector server 230 may use the map to identify template information associated with the template ID of the received data record. Collector server 230 may compare the template ID of the received data record with a list of current template IDs within the map to find a match. Collector server 230 may use the template information associated with the matched current template ID and linked by the identifier for a flow-related event to decode and/or interpret the data record. For example, collector server 230 may use the template included in the associated template information to decode and/or interpret the data record. By using such a map, non-compliant collectors may still decode and/or interpret data records even when template IDs change and the non-compliant collectors are configured not to receive template records.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6E are diagrams of an example implementation 600 relating to example process 600 shown in FIG. 5. FIGS. 6A-6E show an example of using a template mapping system for non-compliant collectors.

Figure 6A:
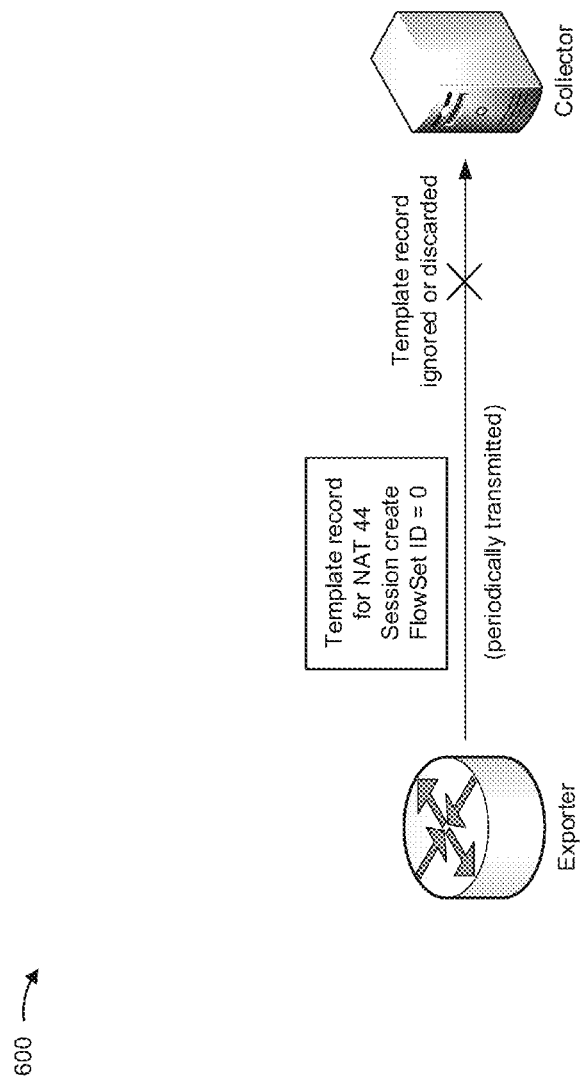
FIGS. 6A-6E are diagrams of example implementations relating to the example processes of FIGS. 4 and 5.

As shown in FIG. 6A, assume an exporter (e.g. exporter device 220) transmits periodically a template record for a NAT44 Session create event to a collector (e.g. collector server 230). Assume that the template record has a FlowSet ID=0. Assume that collector server 230 is configured to identify a flow record with a FlowSet ID=0 as a template record. Assume that collector server 230 is non-compliant and does not accept template records. As shown in FIG. 6A, collector server 230 identifies the flow record with FlowSet ID=0 as a template record and discards and/or ignores the template record.

Figure 6B:
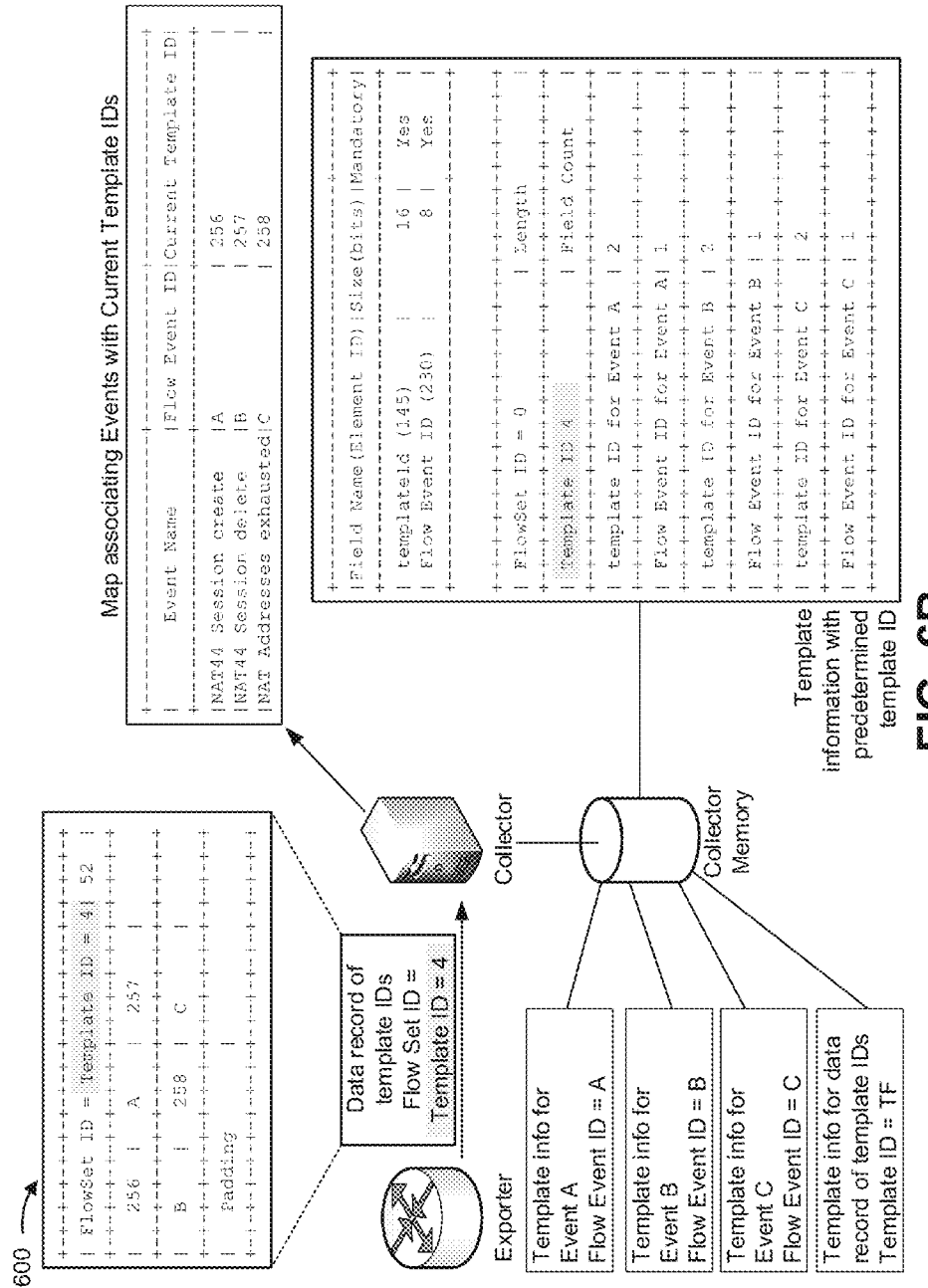

As shown in FIG. 6B, assume exporter device 220 transmits a data record with a FlowSet ID=template ID=4 to collector server 230. Collector server 230 receives the data record for further processing since the FlowSet ID for the data record does not equal the FlowSet ID for a template record (e.g., FlowSet ID=0).

As shown in FIG. 6B, assume that collector server 230 is configured to identify a flow record with a template ID=4 as a data record of template IDs. As shown in FIG. 6B, collector server 230 parses the data record and identifies the template ID=4. Collector server 230 determines that the data record is a data record of template IDs, where the template ID matches the predetermined template ID=4.

Assume that collector server 230 is configured with template information, associated with the predetermined template ID=4 and stored in a collector memory (e.g., collector memory 240), that may be used to parse the data record of template IDs. For example, as shown in FIG. 6B, the template with the predetermined template ID=4 is formatted with fields for current template IDs (e.g., a template ID of Event A, a template ID of Event B, a template ID of Event C, etc.) and fields for corresponding identifiers of flow-related events (e.g., a Flow Event ID for Event A, a Flow Event ID for Event B, a Flow Event ID for Event C). Collector server 230 parses the remainder of the data record of template IDs, using the template information associated with the predetermined template ID=4 (e.g., the template ID of Event A=256, the Flow Event ID=A for Event A, the template ID of Event B=257, the Flow Event ID=B for Event B, the template ID of Event C=258, the Flow Event ID=C for Event C, etc.).

As shown in FIG. 6B, assume that collector server 230 is configured with template information, associated with various flow-related events and stored in collector memory 240, that may be used to decode and/or interpret data records associated with the various flow-related events (e.g., template information 1 with Flow Event ID=A may be used to decode and/or interpret a data record for Event A, where Event A is a NAT44 Session create, template information 2 with Flow Event ID=B may be used to decode and/or interpret a data record for Event B, where Event B is a NAT44 Session delete, template information 3 with Flow Event ID=C may be used to decode and/or interpret a data record for Event C, where Event C is a NAT Addresses exhausted event, etc.)

As shown in FIG. 6B, collector server 230 uses the parsed data record of template IDs and the template information, linked by the Flow Event ID, to generate a map associating current template IDs to corresponding template information for various flow-related events (e.g., a current template ID of 256 may be associated with template information 1 for a NAT44 Session create event and linked by Flow Event ID=A, a current template ID of 257 may be associated with template information 2 for a NAT44 Session delete event and linked by Flow Event ID=B, a current template ID of 258 may be associated with template information 3 for a NAT Addresses exhausted event and linked by Flow Event ID=C.

Figure 6C:
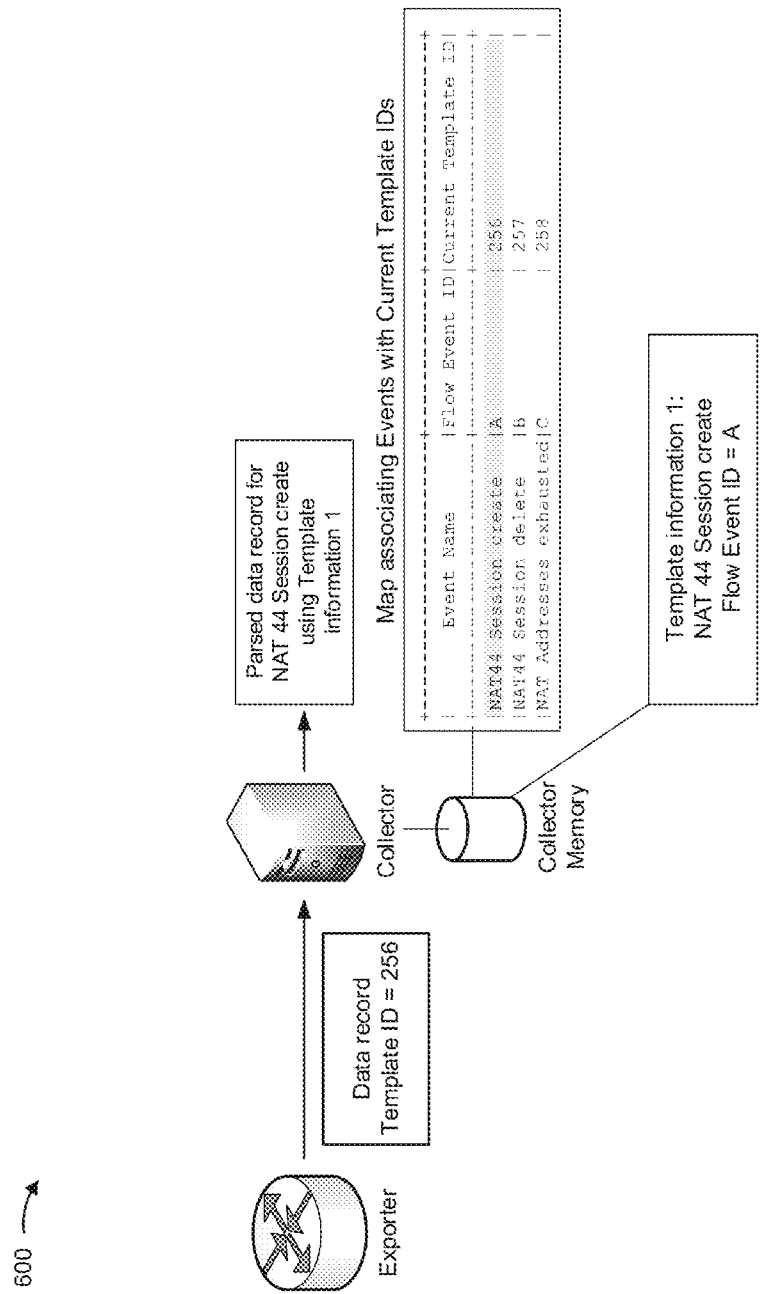

As shown in FIG. 6C, assume exporter device 220 transmits a data record with a FlowSet ID=template ID=256 to collector server 230. Collector server 230 receives the data record for further processing since the FlowSet ID for the data record does not equal a FlowSet ID for a template record (e.g., 0). As shown in FIG. 6C, collector server 230 parses the data record and identifies the template ID=256. Collector server 230 determines that the data record is a data record other than a data record of template IDs (e.g. template ID=256 does not equal the predetermined template ID=4 for data records of template IDs).

Collector server 230 uses the map to associate the template ID=256 of the data record to NAT44 Session create and uses the corresponding template information 1, linked by Flow Event ID=A, to decode and/or interpret the data record.

Figure 6D:
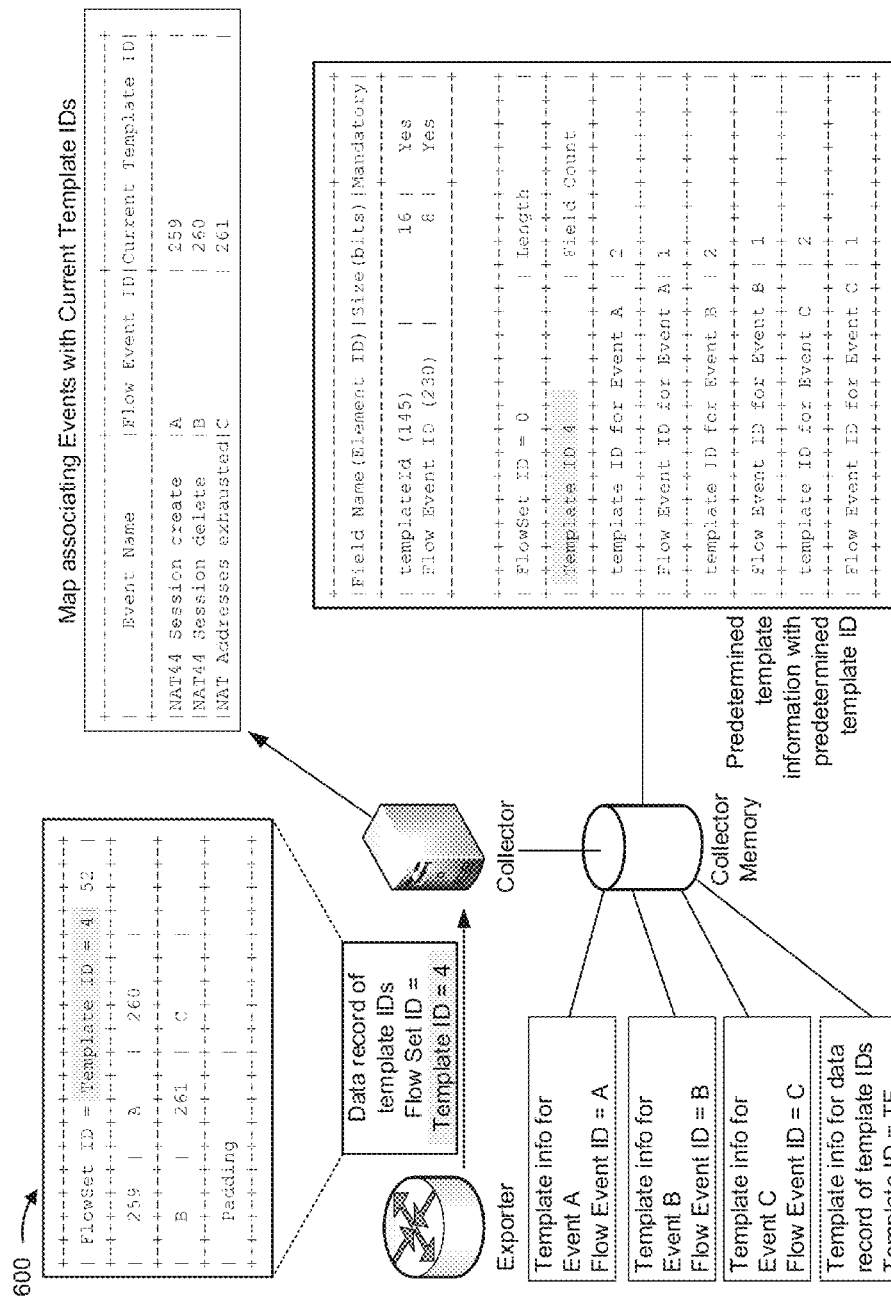

As shown in FIG. 6D, assume that there is a configuration change resulting in exporter device 220 transmitting a new data record with a FlowSet ID=template ID=4 to collector server 230. As shown in FIG. 6D, collector server 230 receives the data record for further processing since the FlowSet ID for the data record does not equal the FlowSet ID for a template record (e.g., 0). As shown in FIG. 6D, collector server 230 determines that the data record is a data record of template IDs, where the template ID matches the predetermined template ID=4. As shown in FIG. 6D, collector server 230 parses the remainder of the data record of template IDs using the template information associated with the predetermined template ID=4 (e.g., the template ID of Event A=259, the Flow Event ID=A for Event A, the template ID of Event B=260, the Flow Event ID=B for Event B, the template ID of Event C=261, the Flow Event ID=C for Event C, etc.).

As shown in FIG. 6D, collector server 230 uses the new parsed data record of template IDs and the template information, linked by the Flow Event ID, to update the map associating current template IDs to corresponding template information for various flow-related events (e.g., a current template ID of 259 may be now associated with template information 1 for a NAT44 Session create event and linked by Flow Event ID=A, a current template ID of 260 may be now associated with template information 2 for a NAT44 Session delete event and linked by Flow Event ID=B, a current template ID of 261 may be now associated with template information 3 for a NAT Addresses exhausted event and linked by Flow Event ID=C.

Figure 6E:
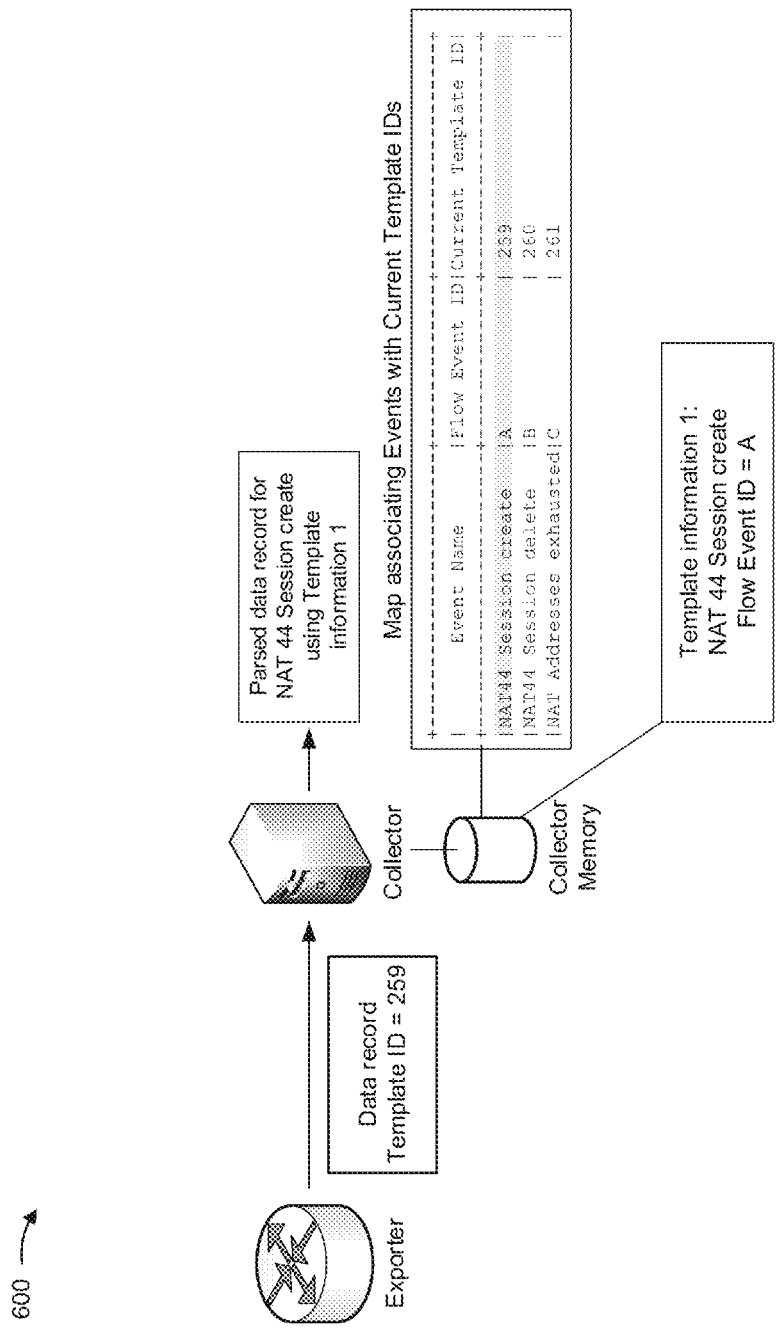

As shown in FIG. 6E, assume exporter device 220 transmits a new data record with a FlowSet ID=template ID=259 to collector server 230. Collector server 230 receives the data record for further processing since the FlowSet ID for the data record does not equal the FlowSet ID for a template record (e.g., 0). As shown in FIG. 6E, collector server 230 parses the data record and identifies the template ID=259. Collector server 230 determines that the data record is a data record other than a data record of template IDs (e.g. template ID=259 does not equal the predetermined template ID=4 for data records of template IDs).

As shown in FIG. 6E, collector server 230 uses the map to associate the template ID=259 of the data record to NAT44 Session create and uses the corresponding template information 1, linked by Flow Event ID=A, to decode and/or interpret the data record.

As indicated above, FIGS. 6A-6E are provided merely as an example. Other examples are possible and may differ from what was described with regard to FIGS. 6A-6E.

Implementations described herein provide a template mapping system for non-compliant collectors that allows for the decoding and/or interpretation of data records even when the template IDs change and collectors are configured not to receive template records with the new template IDs. The template mapping system for non-compliant collectors may use a data record of template IDs that provides information associating current template IDs to various flow-related events (e.g., NAT events). The data record of template IDs may have a predetermined template ID. The collector may have corresponding template information for the data record of template IDs, linked by the predetermined template ID, to parse the data record of template IDs. The collector may use the data record of template IDs to dynamically generate a map associating current template IDs to corresponding template information for various flow-related events. The collector may receive a data record, other than a data record of template IDs, and use the map to identify the appropriate template to use to decode and/or interpret the data record.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising: one or more devices to:
receive a flow record;
identify a type of the flow record;
discard or ignore the flow record if the type of the flow record is a template record, received template records being discarded or ignored and not being used for decoding and/or interpreting data records;
parse the flow record for a template identifier (ID) if the type of the flow record is a data record;
compare the template ID from the data record to a predetermined template ID identifying a data record of template IDs;
identify the data record as a data record of template IDs if the template ID matches the predetermined template ID;
generate a map associating template IDs, from the data record of template IDs, to template information for decoding and/or interpreting data records, the template information being associated with the data record of template IDs; and
store the map,
the map being used to identify an appropriate template associated with the data record of template IDs for decoding ands/or interpreting the data records.

2. The system of claim 1, where information to discard or ignore the flow record, if the type of the flow record is a template record, is stored prior to receiving the flow record.

3. The system of claim 1, where the flow record is a first flow record, the template ID is a first template ID, and the data record is a first data record;
where the one or more devices are further to:
receive a second flow record;
identify a type of the second flow record;
parse the second flow record for a second template ID if the type of the flow record is a second data record;
determine that the second template ID from the second data record matches the predetermined template ID identifying theft data record of template IDs; and
update the map based on template IDs from the second data record.

4. The system of claim 1, where the flow record is a first flow record, the template ID is a first template ID, and the data record is a first data record;
where one or more devices are further to:
receive a second flow record;
identify a type of the second flow record;
parse the second flow record for a second template ID if the type of the second flow record is a data record;
identify a second data record as a data record other than the data record of template IDs if the second template ID for the second data record does not match the predetermined template ID;

use the map to identify the template information associated with the second template ID; and decode and/or interpret the second data record using the template information associated with the second template ID.

5. The system of claim 1, where, when identifying the type of the flow record, the one or more devices are further to:

parse the flow record to determine a flow record identifier included in the flow record, the flow record identifier indicating the type of the flow record;

compare the flow record identifier to one or more flow record identifiers; and identify the type of the flow record based on a match between the flow record identifier and one of the one or more flow record identifiers.

6. The system of claim 5, where the one or more flow record identifiers are stored prior to receiving the flow record.

7. The system of claim 1, where the template IDs, from the data record of template IDs, and the template information for decoding and/or interpreting data records are associated by a corresponding identifier for a flow-related event.

8. A computer-readable medium storing instructions, the instructions comprising:

one or more instructions that, when executed by one or more processors, cause the one or more processors to:
receive a flow record;
identify a type of the flow record;
discard or ignore the flow record if the type of the flow record is a template record, received template records being discarded or ignored and not being used for decoding and/or interpreting data records;
parse the flow record for a template identifier (ID) if the flow record is a data record;
read the template ID from the data record;
determine whether the template ID matches a predetermined template ID;
identify the data record as a data record of template IDs if the template ID matches the predetermined template ID;
generate a map associating template IDs, from the data record of template IDs, to template information for decoding and/or interpreting data records, the template information being associated with the data record of template IDs; and
output or store the map,
the map being used to identify an appropriate template associated with the data record of template IDs for decoding and/or interpreting the data records.

9. The computer-readable medium of claim 8, where the one or more instructions, when executed by the one or more processors, further cause the one or more processors to:

decode and/or interpret the data record of template IDs using template information associated with the predetermined template ID.

10. The computer-readable medium of claim 9, where the template information, associated with the predetermined template ID identifies formatting information and/or attributes for decoding and/or interpreting the data record of template IDs.

11. The computer-readable medium of claim 8, where information to discard or ignore the template record is stored prior to receiving the template record.

12. The computer-readable medium of claim 8, where the data record is a first data record and the template ID is a first template ID;

where the one or more instructions, when executed by the one or more processors, further cause the one or more processors to:
receive a second data record that includes a second template ID; and
use the map to identify the template information associated with the second template ID to decode and/or interpret the second data record.

13. The computer-readable medium of claim 8, where the template IDs, from the data record of template IDs, and the template information for decoding and/or interpreting data records are associated by a corresponding identifier for a flow-related event.

14. A method, comprising:
receiving, by a device, a flow record;
identify, by the device, a type of the flow record;
discarding or ignoring, by the device, the flow record if the type of the flow record is a template record,
received template records being discarded or ignored and not being used for decoding and/or interpreting data records;
parsing, by the device, the flow record for a first template identifier (ID) if the flow record is a data record;
comparing, by the device, the first template ID from a first data record to a predetermined template ID identifying a data record of template IDs;
identifying, by the device, the first data record as a data record of template IDs if the first template ID for the first data record matches the predetermined template ID;
generating, by the device, a map associating template IDs, from the data record of template IDs, to template information for decoding and/or interpreting data records,
the template information being associated with the data record of template IDs; and
using, by the device, the map to identify the template information associated with a second template ID to decode and/or interpret a second data record that includes the second template ID.

15. The method of claim 14, further comprising:
storing the predetermined template ID, associated with the data record of template IDs, prior to receiving the first data record.

16. The method of claim 14, where the template information, associated with the predetermined template ID, is stored prior to receiving the first data record.

17. The method of claim 14, where the template information, associated with template IDs other than the predetermined template ID, is stored prior to receiving the first data record.

18. The method of claim 14, further comprising:
storing information to discard or ignore template records; and
discarding or ignoring the template record based on the information to discard or ignore template records.

19. The method of claim 14, further comprising:
decoding and/or interpreting the data record of template IDs using template information associated with the predetermined template ID, where the template information, identifies formatting information and/or attributes for decoding and/or interpreting the data record of template IDs.

20. The method of claim 14, where the template IDs, from the data record of template IDs, and the template information for decoding and/or interpreting data records are associated by a corresponding identifier for a flow-related event.

* * * * *